(12) United States Patent
Yerli

(10) Patent No.: US 11,416,911 B2
(45) Date of Patent: Aug. 16, 2022

(54) METHOD AND SYSTEM FOR PERSONALIZED AND CONTINUOUSLY UPDATED MAINTENANCE OF ORDERS

(71) Applicant: TMRW Foundation IP S. À R.L., Luxembourg (LU)

(72) Inventor: Cevat Yerli, Frankfurt am Main (DE)

(73) Assignee: TMRW Foundation IP S. À R.L., Luxembourg (LU)

( * ) Notice: Subject to any disclaimer, the term of this patent is extended or adjusted under 35 U.S.C. 154(b) by 1580 days.

(21) Appl. No.: 14/871,841

(22) Filed: Sep. 30, 2015

(65) Prior Publication Data

US 2017/0091852 A1 Mar. 30, 2017

(51) Int. Cl.
*G06Q 30/00* (2012.01)
*G06Q 30/06* (2012.01)
*H04L 9/40* (2022.01)
*G06Q 50/12* (2012.01)

(52) U.S. Cl.
CPC ......... *G06Q 30/0635* (2013.01); *G06Q 50/12* (2013.01); *H04L 63/08* (2013.01)

(58) Field of Classification Search
CPC ..... G06Q 30/0633; G06Q 30/06; G06Q 20/20

USPC .............................................. 705/26.1, 27.1
See application file for complete search history.

(56) References Cited

U.S. PATENT DOCUMENTS

| 9,361,633 | B1* | 6/2016 | Thiagarajan | ....... G06Q 30/0224 |
| 2015/0088676 | A1* | 3/2015 | Elliott | .................. G06Q 20/202 |
| | | | | 705/21 |
| 2015/0269553 | A1* | 9/2015 | Barrett | .................... G06Q 20/28 |
| | | | | 705/39 |

\* cited by examiner

*Primary Examiner* — Jeffrey A. Smith
*Assistant Examiner* — Brittany Bargeon
(74) *Attorney, Agent, or Firm* — Christensen O'Connor Johnson Kindness PLLC

(57) ABSTRACT

A method for automatically maintaining orders on a networked computer is described, comprising maintaining, by the networked computer, information on an order including one or more entries, said information being associated with at least one ordering entity, receiving, by the networked computer, data indicative of an update of the order from the at least one ordering entity via a network, processing the data by the networked computer, updating, by the networked computer, a summary of the order, and providing, by the networked computer, the summary to the at least one ordering entity via the network in response to a trigger. Furthermore, a network system enabling automatic maintenance of orders is described.

21 Claims, 7 Drawing Sheets

METHOD AND SYSTEM FOR PERSONALIZED AND CONTINUOUSLY UPDATED MAINTENANCE OF ORDERS

TECHNICAL FIELD

The present disclosure relates to a method and a network system for automatically maintaining orders. Furthermore, the disclosure may relate to electronic devices acting as ordering or processing entities.

BACKGROUND

Ordering activities are typically encountered during interaction between entities or parties, such as an ordering party and a contractor, agent, or any other processing entity. Ordering activities may be mediated using electronic devices, wherein the ordering entity may submit an order using an electronic device and the contractor or agent may process the order based on data received by another electronic device. However, such processes are often limited to an electronic communication between the electronic devices.

Individual ordering activities, such as ordering in restaurants, even fail to provide support using electronic devices. For example, a member of staff of a restaurant may write down orders with a pen on paper. On being asked for the final bill, then they sum the total required from the customer. This method is prone to a host of human errors which inevitably lead to upset, frustrated, and potentially overcharged customers. For the restaurant these systems can lead to extra stress for staff, mistakes, or under/over-charging, which can all be very damaging and costly to a restaurant's profitability and reputation.

More modern systems do permit computerized ordering and billing which may alleviate many of the errors of paper-based systems. Such systems allow the member of staff to enter orders into an electronic device, which are thereafter transmitted to further staff for further processing. The member of staff may use the electronic device to automatically generate the final bill. However, these systems also require that the orderer and the staff communicate with each other personally, which may again be a source of errors, mistakes or misunderstandings.

In view of the above, one object is to provide a fully supported electronic ordering and billing system.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The above-described technical problems are solved by a method for automatically maintaining orders and a networked system as defined in the independent claims. Furthermore, an electronic device acting as an ordering entity and an electronic device acting as a processing entity are defined.

A first aspect of the present disclosure provides a method for automatically maintaining orders on a network entity, comprising maintaining information on an order including one or more entries on the network entity, said information being associated with at least one ordering entity; receiving, by the network entity, data indicative of an update of the order from the at least one ordering entity via a network; processing the data by the network entity, including generating one or more further entries and inserting the one or more further entries into the information on the order; updating, by the network entity, a summary of the order; and providing, by the network entity, the summary to the at least one ordering entity via the network in response to a trigger.

The network entity may be a hardware device, such as a networked computer.

The networked computer maintains and updates the order of the ordering entity and provides a respective summary to the ordering entity. Accordingly, the ordering entity receives feedback on a current state of the order and may directly control or update individual ordered items. The networked computer generates and updates the summary of the order, which is provided to the ordering entity based on a trigger. Hence, the order is personalized and may be continuously updated. Furthermore, the summary may be used to provide the ordering entity with billing information.

The one or more ordering entities may be a single ordering entity, such as a single customer operating an electronic device to order, book, or reserve certain goods or services, such as ordering a meal in a restaurant. However, the at least one ordering entity may also be a plurality of ordering entities, wherein a plurality of customers operating individual electronic devices may jointly order, reserve, or book goods or services, for example, in order to enable a group ordering in a social network or to simplify ordering of a group of customers in a restaurant directed at a single order.

The one or more entries of the order may be directed at individual services or goods and each one of the one or more entries may be associated with an individual ordering entity or the same ordering entity, which may be a host ordering entity chosen from a plurality of ordering entities. Responsive to reception of the summary of the order, each individual ordering entity may update the associated entries of the order. However, the method may also be adapted to allow each ordering entity to update each entry of the order.

Accordingly, the present disclosure provides for a fully automatic, personalized, and continuously updated ordering processing, which is based on interaction between electronic devices, such as smart devices, thereby allowing for a dynamic customer experience/interaction and providing instant, personalized, and continuously updated ordering and billing information to ordering entities, such as customers.

Preferably, the method may be directed at ordering processes in restaurants, which may allow customers to have personalized and continuously updated ordering and billing information, which may be provided to them via an app of a smartphone. However, it is to be understood that embodiments are not restricted to an application in restaurants only, but may generally encompass any ordering, booking, and/or billing processing, such as hotel reservations, ticket reservations, and e-commerce applications dealing with real-world interaction, as well as ordering, booking, and billing processing in virtual environments, such as within social networks and gaming environments.

According to one embodiment, the method further comprises verifying whether the at least one ordering entity is an authenticated ordering entity, and only processing the data from authenticated ordering entities. The ordering entity may be directly authenticated with the networked computer or another remote entity, such that the ordering entity may be known to the networked computer. However, the ordering entity may, as well, be only authenticated with a remote entity, which may then provide respective information to the networked computer in order to verify the authentication. Hence, the ordering entity may only be known to the remote entity, which may represent a trusted third party. As such, the ordering entity is not required to expose an identity or the authentication data to the networked computer and may be indirectly verified via the trusted third party. This increases the security level since only authenticated ordering entities are allowed to place and update orders. On the other hand, the authentication information is not required to be provided to the contractor or agent in its entirety or at all, thereby maintaining sensitive data from being distributed to various instances.

In yet another embodiment, the method further comprises maintaining in the information one or more flags indicating whether an ordering entity of the at least one ordering entity is an authenticated ordering entity. After verification, a respective flag may be set to speed up subsequent verifications. Furthermore, the flags may be updated on a regular basis.

According to yet another embodiment, the at least one ordering entity is automatically connected to an access point of the network. The at least one ordering entity may be registered with a provider of the network and/or the access point of the network, enabling an automatic connection to the network. For example, the at least one ordering entity may receive a secret value from the provider of the network, which may enable the at least one ordering entity to generate a password for accessing the network via the access point. The registration with the network may provide a further authentication of the at least one ordering entity, which may be further used to verify the ordering entity and/or to set respective flags indicating whether an ordering entity is an authenticated ordering entity.

In yet another embodiment, said order is associated with at least one processing entity. The processing entity may be one or more electronic devices being operated by an agent, contractor, or service provider, or any other entity providing services or goods that can be ordered, booked, or reserved. The processing entity may, as well, be an electronic device operated by staff of the provider, such as staff in a restaurant or hotel, or virtual staff within a social network or a gaming environment. The processing entity may be configured to process the order, such as to ship, supply, provide, maintain, or renew a service or product according to the order. The processing entity may be a single processing entity automatically processing the order on its own. However, the at least one processing entity may also be a plurality of processing entities, such as a plurality of electronic devices or smartphones of staff in a restaurant, further electronic devices, such as tablets, placed in a kitchen of the restaurant or personal computer in a billing or accounting department of the restaurant, and the like. Each one of the processing entities may access the information on the order and may modify and update the individual entries of the order.

Hence, by using the automatic connection via individual access points of the network, the ordering entity, such as customers and/or users, can be connected to the provider of the services or goods operating the networked computer. Hence, the provider of services or goods operating the networked computer may be connected to the customers operating individual ordering entities. For example, in a restaurant, any food and drinks orders made by customers ahead of time could be recorded/stored by the networked computer and, therefore, already be included in their own personalized summary of the order, such as a personalized bill. Any further orders made by them through the respective ordering entities could be processed through the networked computer and the information could then be added to their personalized summary. This may allow customers operating individual ordering entities to see their own orders and their current summary in real time on the ordering entities, such as their smart devices. Furthermore, orders made personally, i.e., directly through staff of the provider of goods or services and, therefore, for example via a processing entity operated by the staff, could also register the order through the networked computer, which may then appear on the summary of the customer/user.

In yet another embodiment, the data indicative of an update is received via the network from the at least one ordering entity or the at least one processing entity. The information on the order may further maintain access restrictions, allowing individual ordering entities and/or processing entities to update individual entries of the order. For example, ordering entities may be allowed to update data of their associated entries only, and processing entities may be allowed to update or modify any parts of the order. In each case, the update will be reflected in the summary of the order, which may be distributed to the individual ordering entities for review and/or confirmation.

In yet another embodiment, said processing the data further includes forwarding, via the network, the one or more further entries to the at least one processing entity. Accordingly, any orders and/or updates may be directly notified to individual processing entities, which may immediately react on any update. The respective processing entity may also accept or cancel the update. For example, if an order has already been processed and cannot be updated, the processing entity may cancel the respective update.

In one embodiment, said processing the data includes generating one or more further entries and inserting the one or more further entries into the information on the order. Accordingly, the at least one ordering entity may place further items of the order, such as goods or services.

In yet another embodiment, said processing the data includes updating the one or more entries based on the data indicative of the update of the order.

In one embodiment, the trigger is generated by the at least one ordering entity or the at least one processing entity.

In an embodiment, the trigger is generated in response to the at least one ordering entity leaving an area defined by a geo-fence. For example, the provider of goods or services may define a geo-fence indicating a location, where the goods or services are provided. As soon as the ordering entity enters the geo-fence, the order may be processed and/or as soon as the ordering entity leaves the area defined by the geo-fence, the summary may be provided to the ordering entity, for example as personalized and continuously updated billing information. In order to generate the trigger, the processing entity may provide location data to the networked computer, which may compare the location data with data describing the geo-fence and generate the trigger.

Preferably, the trigger is generated in response to the at least one ordering entity logging off the network. For example, the ordering entity may be automatically connected to the network via the access point of the network by receiving a secret value to generate a password as described further below. As soon as the ordering entity attempts to log out of the access point, the trigger may be generated and the networked computer may try to provide the summary to the ordering entity via the same network if the ordering entity is still connected to the network, or via another network, such as a mobile network, if the ordering entity is already disconnected from the network.

In yet another embodiment, the information is provided via the network to a gateway, which provides means for paying the bill or parts thereof according to the order, and is configured to balance the order with the at least one ordering entity. The gateway may be a payment gateway, which may allow individual ordering entities, such as a host of a restaurant party, to pay the whole order or bill on behalf of the other ordering entities, such as their guests, or the bills of certain guests, or for individuals to pay their own bills. The payment gateway may allow users/billpayers operating individual ordering entities to pay their bill using a stored profile, which may include individual payment information. The profile may also be stored by a trusted third party. The payment methods may include manual and/or unobtrusive automatic payment mechanisms. The manual payment mechanism may allow customers to trigger a payment state via an application on the ordering entity and may select a payment method, such as card, cash, etc. The application may also allow the client to select the other options, such as paying the whole bill, paying for certain guests or just their own bill. Unobtrusive automatic payment mechanisms may represent an option when users/customers have a stored credit card as part of their profile. In this case, the payment may be done entirely automatically as soon as the user/customer and/or their respective ordering entity leaves a place of the provider of goods or services, such as when leaving an area defined by a geo-fence. The payment gateway may charge the payment instrument automatically when a processing entity, such as restaurant staff, mark the order of the ordering entity, such as table of the customer, as finished in a corresponding application on the processing entity.

In yet another embodiment, the method is for taking orders and billing guests operating said at least one ordering entity in a restaurant.

According to another aspect of the present disclosure, a networked system is provided, comprising a network, a server connected to the network, and one or more ordering entities connected to the server via the network, wherein the server is configured to maintain information on an order including one or more entries, said information being associated with at least one of the one or more ordering entities; receive data indicative of an update of the order from the at least one ordering entity via the network; process the data and update a summary of the order; and provide the summary to the at least one ordering entity via the network in response to a trigger.

In an embodiment, the server is further configured to clarify whether the one or more ordering entities are authenticated ordering entities, and to process the data only from authenticated ordering entities.

According to one embodiment, the server is further configured to maintain in the information one or more flags indicating whether an ordering entity of the at least one associated ordering entity is an authenticated ordering entity.

In one embodiment, the at least one ordering entity is automatically connected to an access point of the network.

According to one embodiment, said order is associated with at least one processing entity.

In one embodiment, the data indicative of an update is received via the network from the at least one ordering entity and/or the at least one processing entity.

In one embodiment, said processing the data includes generating one or more further entries and inserting the one or more further entries into the information on the order.

According to yet another embodiment, said processing the data further includes forwarding, via the network, the processed data to the at least one processing entity.

In one embodiment, the trigger is generated by the at least one ordering entity or the at least one processing entity.

According to one embodiment, the trigger is generated in response to the at least one ordering entity leaving an area defined by a geo-fence.

In one embodiment, the trigger is generated in response to determining that the at least one ordering entity attempts to log out of an access point of the network, such as at a boundary of the area defined by the geo-fence.

In yet another embodiment, the system further comprises a gateway device configured to balance the order with at least one of the one or more ordering entities.

Preferably, the server, the ordering entities, the network and the gateway may comprise hardware or may be implemented in hardware, such as on a computing device or electronic device, for example, a server device, a personal computer, or a smart device.

According to a further aspect of the present disclosure, an electronic device is provided comprising an interface configured to connect the electronic device to a network, and a processor configured to place an order including one or more entries with a central entity, send data indicative of an update of the order to the central entity via the network, and receive from the central entity a summary of the order via the network in response to a trigger, wherein the central entity receives the data indicative of the update, processes the data and updates the summary of the order according to the processed data. Preferably, the electronic device may act as an ordering entity according to embodiments of the present disclosure.

According to yet another aspect, an electronic device is provided, comprising an interface configured to connect the electronic device to a network, and a processor configured to act as a processing entity according to embodiments of the present disclosure.

According to yet another aspect of the present disclosure, a computer-readable medium having instructions stored thereon is provided, wherein said instructions, in response to execution by a computing device, cause said computing device to automatically perform a method according to embodiments of the present disclosure. In particular, said computing device may correspond to an ordering entity, to a networked computer and/or to a processing entity according to embodiments of the present disclosure.

Furthermore, embodiments according to the method for automatically maintaining orders and embodiments of the networked system and/or embodiments of the electronic devices may be combined. For example, the network, the server, or the one or more ordering entities of the networked system according to one or more embodiments may be configured to perform the method or individual method steps of the method for automatically maintaining orders, according to one or more embodiments of the present disclosure. Furthermore, embodiments of the method for automatically maintaining orders may include processing steps directed at functionality of the components of the networked system, according to one or more embodiments of the present disclosure in any combination.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

In the following description, reference is made to drawings which show by way of illustration various embodiments. Also, various embodiments will be described below by referring to several examples. It is to be understood that the embodiments may include changes in design and structure without departing from the scope of the claimed subject matter.

Figure 1:
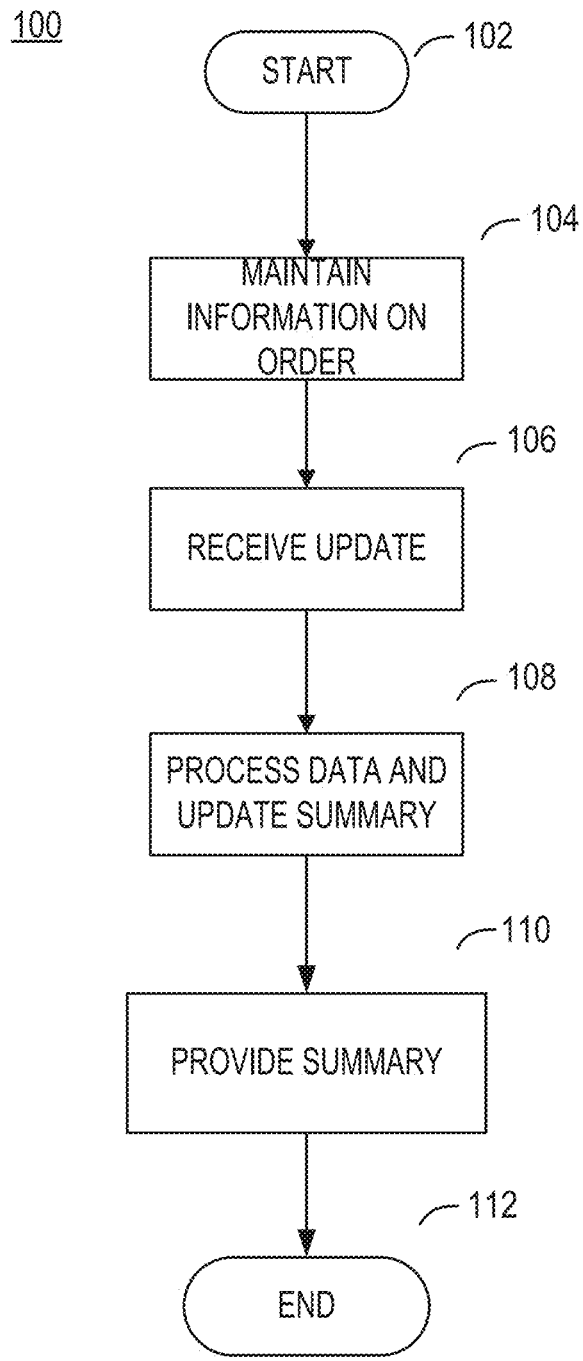
FIG. 1 shows a flow chart of a method for automatically maintaining orders on a networked computer according to an embodiment of the present disclosure.

FIG. 1 shows a flow chart of a method for automatically maintaining orders on a networked computer. The method 100 may be performed on the networked computer and may start in item 102. The method 100 may proceed with item 104, wherein information on an order including one or more entries is maintained. Said information may be associated with at least one ordering entity. The method may proceed with item 106 by receiving data indicative of an update of the order from the at least one ordering entity via a network. In item 108, the data may be processed and a summary of the order may be updated. In item 110, the summary may be provided to the at least one ordering entity via the network in response to a trigger. The summary may represent billing information for a customer operating the at least one ordering entity. Hence, instant, personalized, and continuously updated billing information is provided to the customer. Furthermore, the customer may control the order, individual entries of the order, such as goods or services, and may update the respective information in real time, which will be reflected in the summary of the order. Hence, the customers are connected to a provider of goods or services which, in turn, are connected to the customer using a direct and instantaneous communication technology.

The connection may be mediated via a trusted entity, such as a trusted third party, which may provide an automatic access to the network based on a plurality of passwords generated based on secret values and individual identifications of access points of the network.

Figure 2:
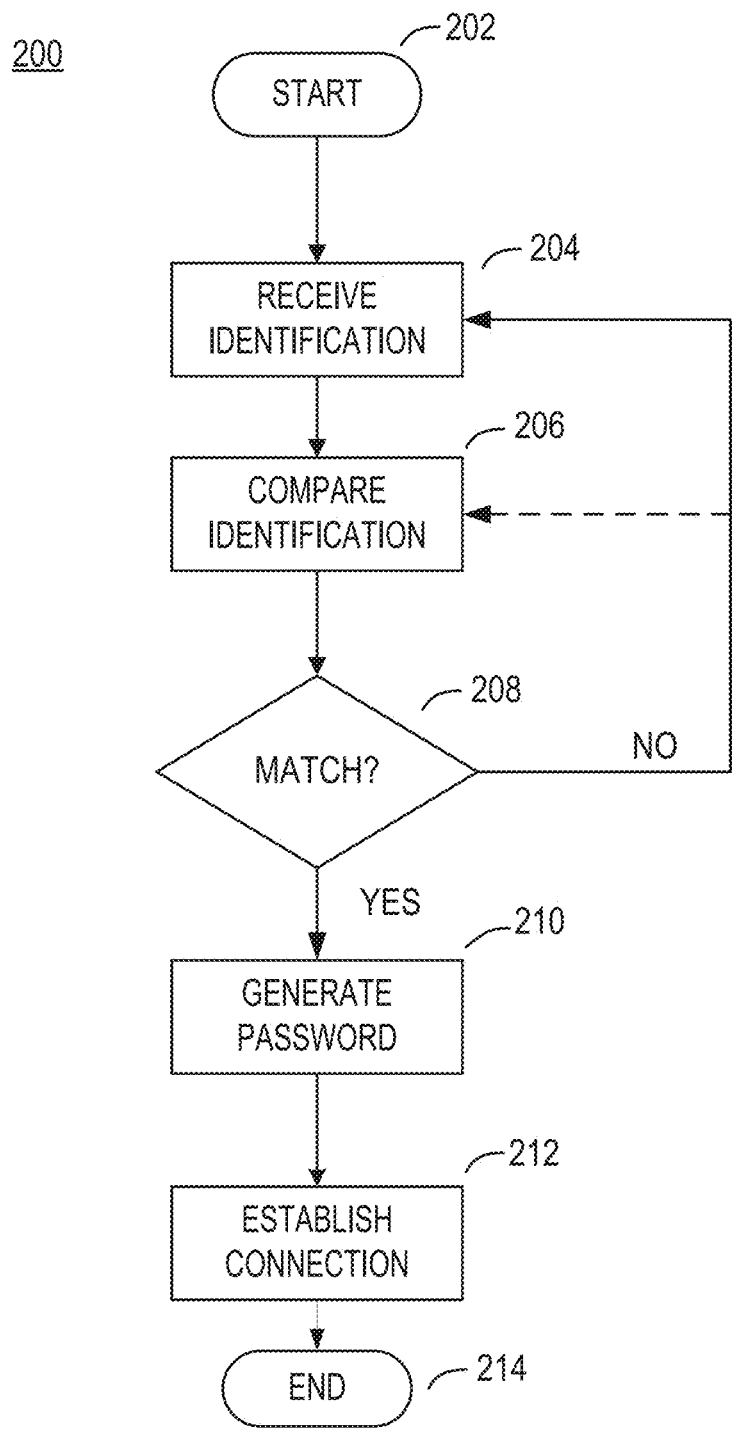
FIG. 2 shows a flow chart of a method for automatically accessing communication networks applicable in an embodiment of the present disclosure.

FIG. 2 shows a flow chart of a method for accessing communication networks applicable in one embodiment of the present disclosure. The method 200 may be performed on a device, such as an ordering entity, a client device or a communication device and may start in item 202. The method 200 may proceed with item 204, wherein identifications of available communication networks may be received. In item 206, at least one of the received identifications of the available communication networks may be compared to at least one pattern corresponding to identifications of registered communication networks. If the compared identification matches the pattern as determined in item 208, the method 200 may proceed with item 210, where a password for accessing the communication network may be generated. If no match is found, the method 200 may proceed with item 204 and receive further identifications of available communication networks. As an alternative, the method 200 may directly proceed with item 206 if more than one identification of available communication networks have been previously received and may continue the comparison of the next available identification. In item 210, the password may be generated by applying a cryptographic function parameterized with a secret value associated with the communication network to the identification. The method 200 may proceed with item 212 where, using the generated password, a connection to the available communication network is automatically established and the method may end in item 214.

Accordingly, the method 200 allows a client device to establish a connection with a communication network without complicated retrieval of a password, for example, by connecting to a provider of the communication network, scanning respective data and/or typing in the password. Rather, the password is automatically generated by using a cryptographic function associated with the communication network and used to directly establish a connection with the communication network.

For example, the communication device may be a smart device with an installed client application (or "app") that may be retrieved via a typical application distribution platform or via a link of a central entity enabling registration of the individual communication networks. The client app may reside on the smart device similar to any other application. Preferably, the client app may be further secured. Embedded within the client app may be information on available communication networks, such as Wi-Fi networks, for example a list of available communication networks or at least one pattern defining valid identifications of registered communication networks. Once the client device is within a range of a registered communication network as determined in items 206 and 208, the password for accessing the Wi-Fi network may be automatically generated in item 210. The communication device or the client app may further scan available Wi-Fi networks which may be within the range of a smart device or communication device. The communication device may search for matching identifications of registered communication networks as described above. If a plurality of registered communication networks are found, a user of the communication device may be enabled to manually select a preferred communication network. The automatically generated password enables the communication device to directly connect to the selected available Wi-Fi network.

Further to the information on available and/or registered communication networks, the client app may also store therein one or more of the secret values associated with individual registered communication networks. The secret values may be initially retrieved by the client app or may be retrieved via a dedicated communication link responsive to an initial attempt to access a registered communication network, for example, using the registered communication network or a mobile communication network. The secret values may remain valid for a certain period of time. The secret values may be updated periodically, pushed to the client app or pulled from the central entity. The secret values may also be directly retrieved in order to generate the password and may be deleted thereafter.

The secret values can have a smaller size than an actual password. Hence, a retrieval of the secret value requires a very low bandwidth of a couple of bytes. Since only the secret value, and not the actual password, is transmitted, the password cannot be directly extracted from the communication. Furthermore, an intruder without knowledge of the cryptographic function cannot generate the password even when the secret value is extracted from the communication. This improves the security level of providing automatic access to communication networks.

Hence, individual ordering entities may automatically access the network via access points and the central entity may provide information on the authentication of the ordering entities for respective verification.

Figure 3:
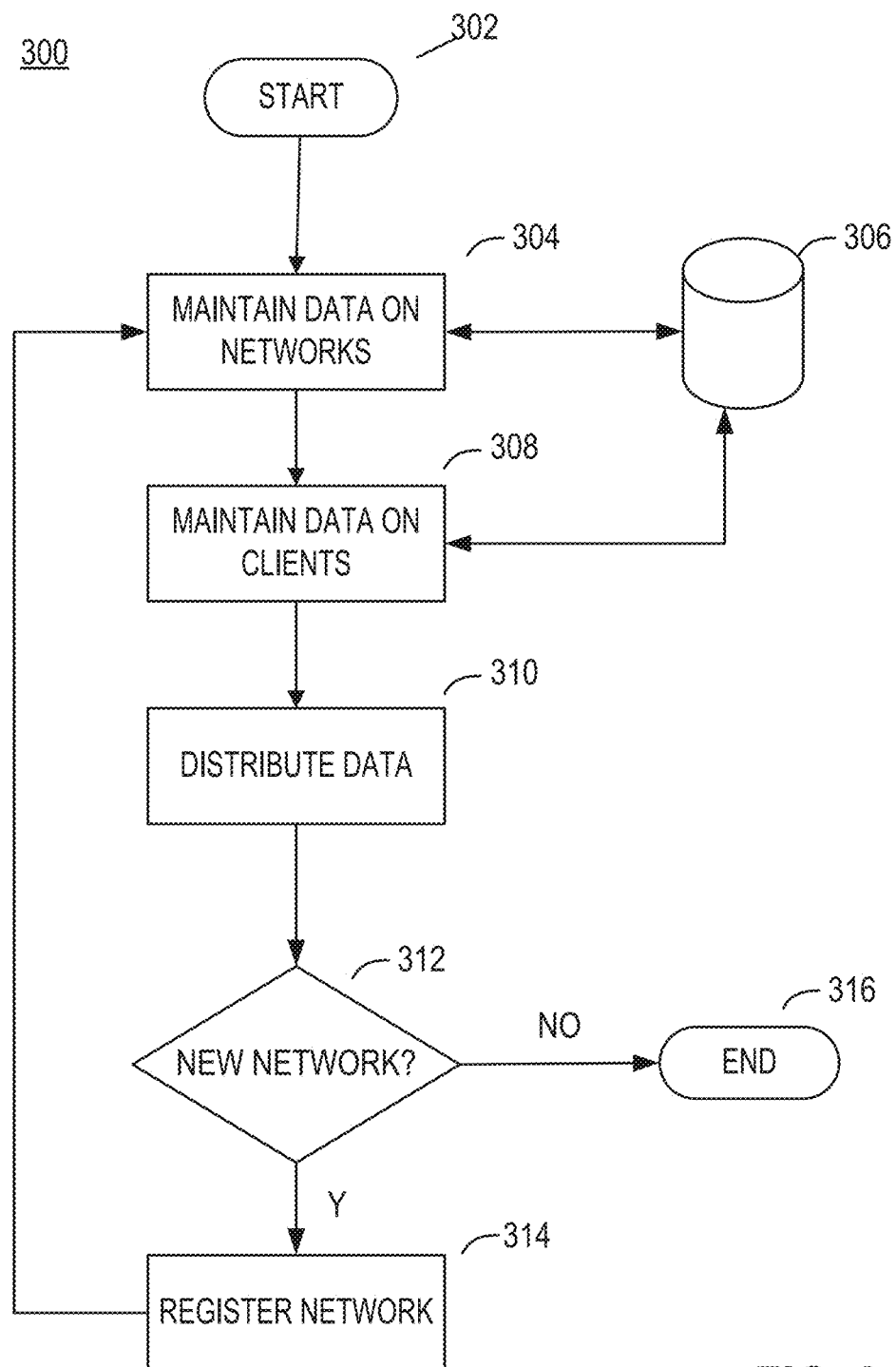
FIG. 3 shows a flow chart of a method for managing access to communication networks applicable in embodiments of the present disclosure.

FIG. 3 depicts a flow chart of a method for managing access to communication networks applicable in embodiments of the present disclosure. The method 300 may start in item 302. The method 300 may maintain data on a plurality of communication networks in item 304. For example, the data, which may include for each communication network an identification of the communication network, a cryptographic function and/or at least one secret value associated with the communication network, may be stored in a database 306.

The method 300 may proceed with item 308, wherein data on a plurality of client devices is maintained. The data on the client devices may comprise identification information, connectivity information, respective users of the client device, association and affiliation of the client devices with groups of client devices, such as communities and the like.

Each communication network may be accessible by one or more passwords, wherein at least one of the one or more passwords may be generated by application of the cryptographic function parameterized with the at least one secret value associated with the communication network to the identification of the communication network. During set up or registration of a communication network, the passwords may be generated and provided to the communication network. However, the passwords are not required to be stored, for example, in the database 306 since they can be rebuilt using the cryptographic function, the secret value and the identification of the communication network.

The method 300 may proceed in item 310, wherein the data on the available communication networks including information on the identification of the communication network, the cryptographic function and/or the at least one secret value associated with the communication network may be distributed to at least some of the client devices. However, it is to be understood that the information is not required to be distributed at an initial state. Rather, if the identification of the communication network matches a pattern of registered communication networks and if the cryptographic function is known by the client devices, the client devices may request the secret value responsive to an attempt to connect to the registered communication network.

The method 300 may proceed in item 312 where it is determined whether a new network is to be registered. If a new network is to be registered, the method may proceed with item 314 by receiving an identification of the new network. The identification of the new network may be checked to comply with regulations, rules, or patterns of registered communication networks, such as a prefix or a suffix or any other expression. If the identification does not match the requirements of registered communication networks, either a valid identification of a registered communication network may be proposed or an updated identification of the new network complying with the requirements may be requested. As indicated by the back arrow to items 304 to 310, respective one or more passwords may be generated for the new network, and the data on the new network may be updated in database 306 and distributed to at least some of the client devices. If no new network is to be registered, the method 300 may end in item 316. Likewise, the method may continue in a listen mode in order to determine whether new networks are to be registered.

The method 300 may be used on a central entity or authority where a provider of a communication network, such as a business, university, administration, or any other entity providing communication networks may register, for example, by creating an account and submitting data on the available communication network. The account creation process may include a registration and/or creation of an identification of the communication network, such as an SSID of a wireless network, which may include a reference to the central entity or authority followed by a name of the provider or any available name. The identification may be made up of upper and/or lower case letters or alphanumeric characters in any combination. As an example, an SSID may reflect the name of a business or institution providing the wireless network. By submitting the identification or SSID to the central entity or authority, at least one secure password may be automatically generated. The secure password may be returned to the provider of the communication network, which is required to set up the communication network according to the created one or more passwords and the chosen identification. For example, a Wi-Fi router may be configured using the one or more passwords and the chosen SSID. Once this is accomplished, the communication network is ready for use. Once the central entity or authority has generated the secret passwords, they can be deleted and the central entity or authority needs only to store the secret values associated with the communication network. On the other hand, the provider of the communication network is not required to have any knowledge of the (secret) cryptographic functions or the procedure by which the secret passwords have been generated.

Accordingly, a provider of a communication network, such as the provider of the network for automatic ordering and billing according to embodiments of the present disclosure, may set up one or more access points of the network by generating an identification for the network, which may include any alphanumeric combination of a name. The identification may be transmitted to a central entity in order to register the communication network with the central entity. The central entity may verify the identification for compliance with their pattern or rules for identifications of registered communication networks. If the identification does not comply with respective requirements, the central entity may request a modified identification of the communication network. If the identification complies with the requirements, the central entity may use the identification and generate at least one password for the communication network by using a cryptographic function parameterized with at least one secret value applied to the identification of the communication network. The generated passwords may be sent back to the provider.

The method enables a simplified set-up of a communication network, wherein the passwords are generated by a central entity or authority using a cryptographic approach. A community of users operating respective client devices may be registered with the central entity or authority and may retrieve data from the central entity or authority in order to securely connect to the communication network by automatically creating respective passwords on demand. Hence, the provider of the communication network need not further distribute the passwords, nor is the provider of the communication network required to register new users. Rather, the communication network is accessible by all client devices of the community using the services of the central entity or authority.

Figure 4:
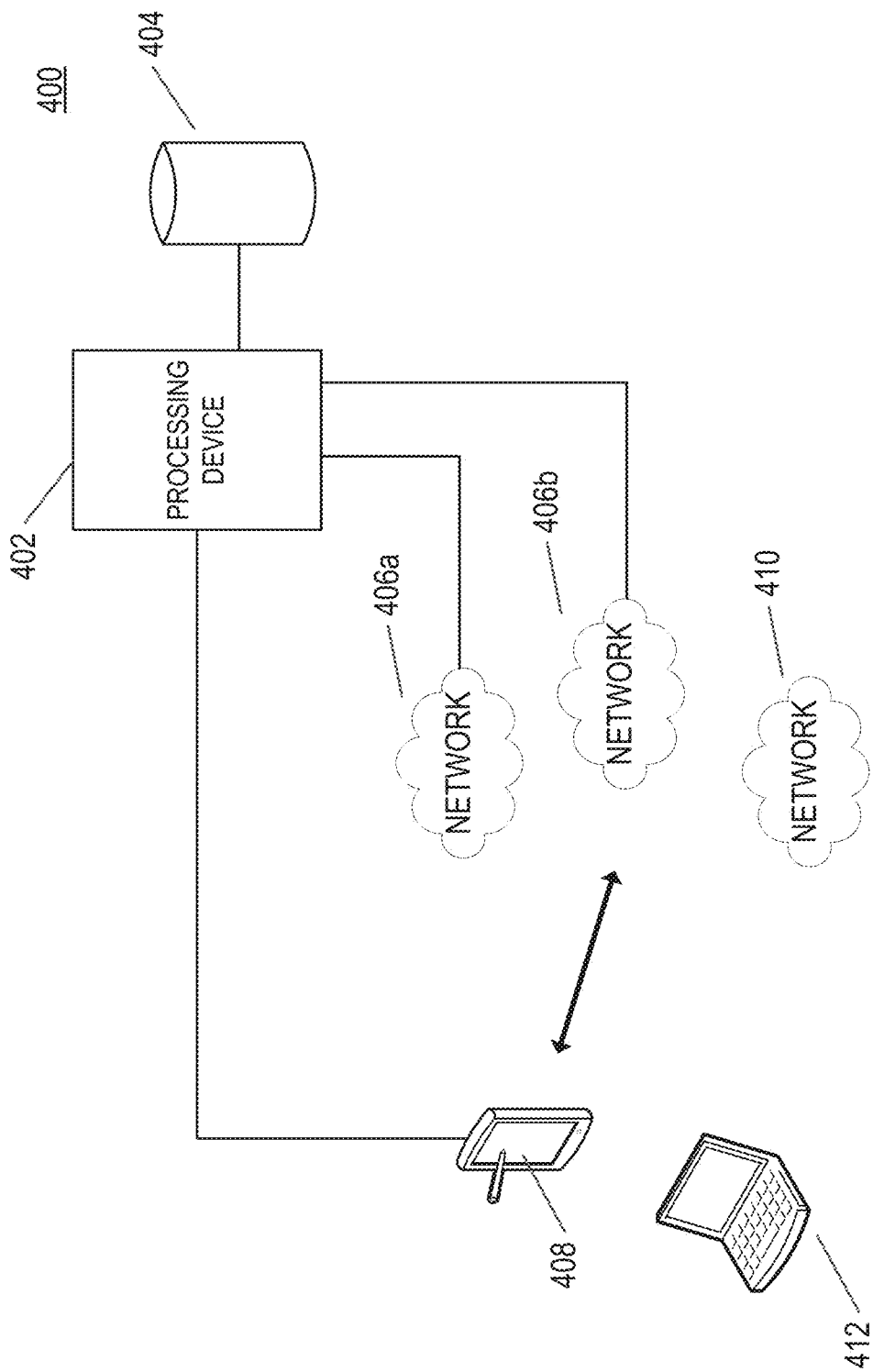
FIG. 4 shows a schematic system overview according to one embodiment.

FIG. 4 shows an infrastructure of a networked environment according to one embodiment of the present disclosure. The infrastructure 400 may comprise at least one processing device 402, which may be connected to at least one database 404. The processing device 402 may be configured to perform the method 200 of FIG. 2. Likewise, the processing device 402 may access the database 404 similar to the database 206 of FIG. 2. The processing device 402 may enable registration of a plurality of networks 406a, 406b, and the data on the networks 406a, 406b may be stored in the database 404. Furthermore, the processing device may enable registration of communication devices, such as communication device 408. It is to be understood that even though only a single communication device 408 and only two communication networks 406a, 406b are shown, the embodiments are not restricted to a particular number of client devices or networks and may, rather, enable registration and maintenance of a large amount of devices 408 and networks 406a, 406b.

Accordingly, there may be three main parties involved in embodiments of the present disclosure, including the provider of the networks 406a, 406b, the central entity managing respective data and arbitrating between devices 408 and the networks 406a, 406b, and the users of the networks 406a, 406b operating respective devices 408.

Each network 406a, 406b may be registered with the processing device 402 by sending an identification of the networks 406a, 406b to the processing device 402, which may, in turn, generate secret passwords for the networks 406a, 406b by applying respective cryptographic functions, which may be different or the same cryptographic functions, to the identifications of the networks 406a, 406b. The networks 406a, 406b are set up with the generated passwords.

Furthermore, the device 408 may register with the processing device 402 and may receive information on identifications of available networks, such as the networks 406a, 406b. As soon as the device 408 is in the range of one of the networks 406a, 406b, the identification of the network 406a, 406b may be compared to the information on registered communication networks on the device 408 and if a registered communication network is identified, the password may be automatically generated by applying a parameterized cryptographic function to the identification of the identified network. The password may thereafter be used to directly connect to the network. Hence, for example if device 408 attempts to connect to the network 406b, the password may be automatically generated and the device 408 may be directly connected to network 406b. The communication device 408 may, for example, execute the method 200 shown in FIG. 2.

In contrast, if the device 408 attempts to connect to network 410, which may not be registered with the processing device 402, the device 408 may have to explicitly determine the required password for connecting to the network 410, such as by scanning a code or via RFID, connecting to a provider of the network 410 or in a similar way, which in comparison to a connection to the networks 406a, 406b is inconvenient and may discourage the user of device 408 to connect to the network 410. FIG. 4 further shows another device 412 which may not be registered at the processing device 402. Since the device 412 does not have any knowledge of registered networks 406a, 406b, it has to retrieve respective passwords using other techniques, which may be inconvenient and tedious. Furthermore, networks 406a, 406b need not enable retrieval of the passwords in any other way, thereby allowing only users of a community of registered devices 408 to connect to the networks 406a, 406b. Hence, the automatic access to networks according to embodiments of the present disclosure enables for a convenient and easy, yet controlled connection to registered networks by registered devices.

The device 408 may be any kind of electronic device, communication device or the like, such as a smart device. Furthermore, the networks 406a, 406b may be any type of wired or wireless communication network, such as 3G networks or Wi-Fi networks, enabling access to wide area networks, such as the Internet, or any other type of network. However, the present disclosure is not restricted to a particular type of device, network or communication protocol. Rather, any device, such as a portable computer or a personal computer, may be registered with the processing device 402 in order to connect to any kind of network, such as a wireless network or a wired LAN connection, that may be available in hotels, at airports, or at other businesses or institutions, for example.

The device 408 may include a built-in GPS and other sensors in order to, for example, determine a location of the device 408. This may be used by the processing device 402 to determine a position of the device 408 with regard to available networks 406a, 406b and update the data on the device 408 with regard to a geolocation of the device 408.

The communication device 408 may be an ordering entity according to embodiments of the present disclosure. Furthermore, the communication device may be a processing entity according to embodiments of the present disclosure. Furthermore, the processing device 402 may correspond to the networked computer according to embodiments of the present disclosure. However, it is to be understood that the processing device 402 may be dedicated to providing automatic access to networks 406a, 406b and the system 400 may include further processing devices acting as the networked computer. In this case, the processing device 402 may be used as a trusted entity for verifying the communication devices 408 for placing orders and billing purposes.

Figure 5A:
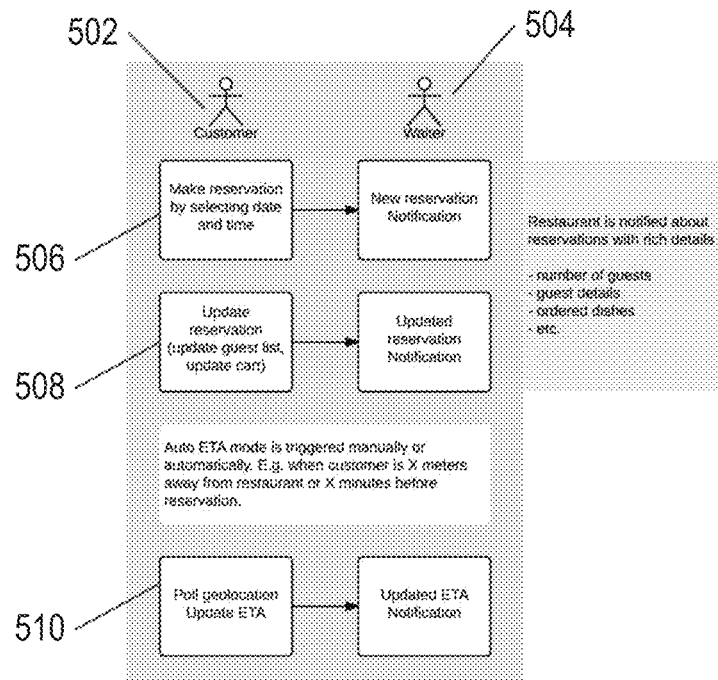
FIGS. 5A-5C show another schematic overview of a system according to one embodiment of the present disclosure.
Figure 5B:
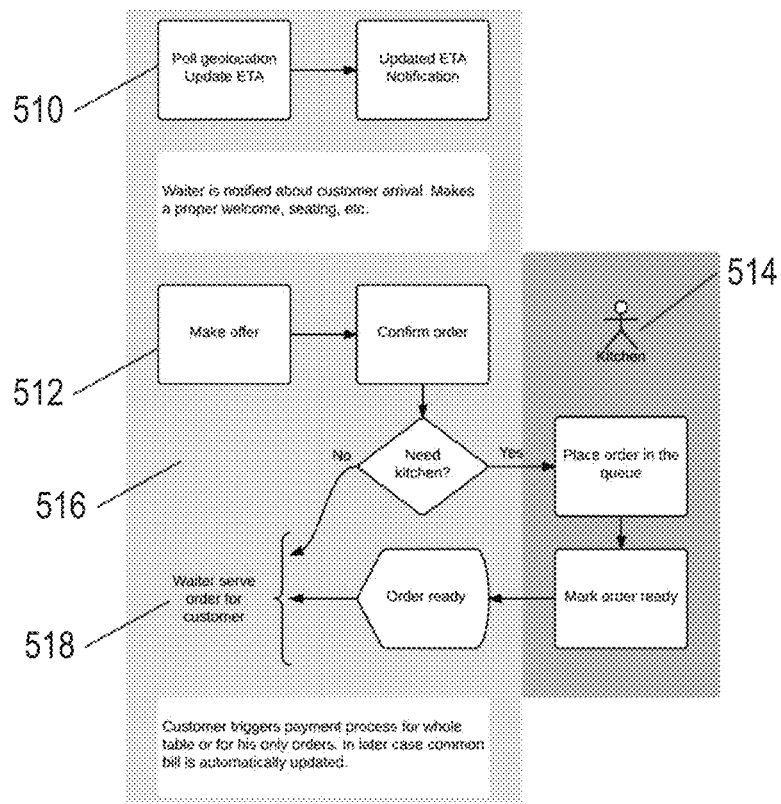
Figure 5C:
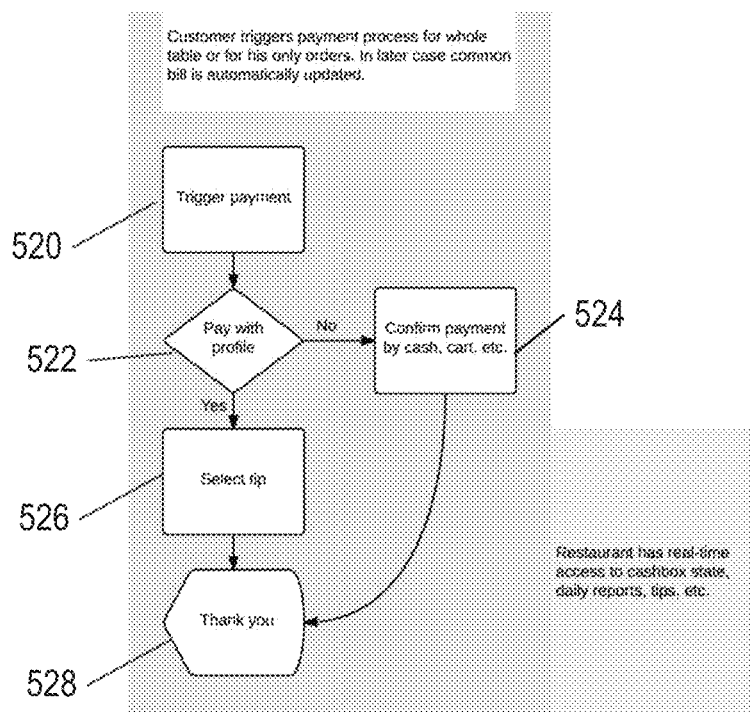

FIGS. 5A to 5C show a system outline of a ordering and billing process directed at customers interacting with staff of a restaurant based on one or more embodiments of the present disclosure.

As shown in FIG. 5A, a customer 502 may interact with a waiter 504 of a restaurant. Both the customer 502 and waiter 504 may use an electronic device, such as smartphones, in order to submit and/or receive orders, reservations, and the like. The customer 502 may make a reservation by selecting a date and a time in item 506. The respective reservation may be automatically received by the electronic device of the waiter 504. All data and information directed at the reservation may be maintained on a central entity, which may be operated by the restaurant or by another third entity. The customer 502 may review and update the reservation as indicated in item 508. The update will be received by the waiter 504 or another member of staff of the restaurant. Accordingly, the restaurant may be notified about reservations in real-time. Furthermore, the reservations may contain detailed information on the customer and further rich details, such as a number of guests, details on individual guests, ordered dishes and the like.

The smartphone or another electronic device of the customer 502 may further provide location information to the central entity in order to allow for an automatic estimation of the time of arrival (ETA). The ETA mode may be triggered manually or automatically. In the manual mode, the customer 502 may start the auto-ETA mode by interacting with a smartphone. In the automatic mode, the ETA calculation may be started when the customer 502 is within a certain distance from the restaurant or within a time range specified by the reservation, such as X minutes before the reservation.

As indicated in item 510, the smartphone or electronic device of the customer 502 may pull a geolocation of the smartphone and update the ETA calculation, which information may be transmitted to the waiter 504 or another staff of the restaurant.

The processing may continue as shown in FIG. 5B. After receiving the updated ETA notification in item 510, the waiter 504 may be actively notified by his smartphone or electronic device about the customer's arrival. Hence, the waiter 504 may make a proper welcome, arrange seating, and the like. Thereafter or concurrently, the customer 502 may place an order, as indicated in item 512. The waiter 504 may confirm the order and the customer 502 may be provided with a summary of the order according to one or more embodiments of the present disclosure. The waiter 504 may review the order and may decide whether further staff of the restaurant is required to process the order, such as in a kitchen 514 of the restaurant. If further staff of the restaurant is needed, the waiter 504 may automatically place the order of customer 502 by transmitting respective information to the kitchen 514, as indicated in item 516. The kitchen 514 may process the order and notify the waiter 504 when the order is ready. Thereafter, the waiter 504 may serve the order to the customer 502, in item 518. It is to be understood that the processing in item 516 may be synchronized with the processing in item 510 such that the waiter 504 may place the order, however, the order may be marked as ready for processing by the kitchen 514 based on the estimated time of arrival of the customer 502. Furthermore, the waiter 504 may be required to confirm that the customer 502 has arrived at the restaurant.

The customer 502 may trigger payment process using the smartphone or electronic device automatically or manually. Furthermore, the customer 502 may select options of the payment process. For example, the customer 502 may be a host of a restaurant party and may decide to pay the whole bill on behalf of their guests, or the bills of certain guests, or for individuals to pay their own bills.

As shown in FIG. 5C, the payment may be triggered in item 520. Responsive to the trigger, the summary of the order may be provided to the customer 502, wherein the summary may include the billing information according to the chosen options. The customer 502 may decide whether to pay with a profile, which may be either registered with the restaurant or with another central entity, such as a trusted third party, in item 522. If the customer 502 decides not to pay with a registered profile, the waiter 504 may interact with the customer 502 in order to proceed with payment using various payment instruments, in item 524. However, if the customer 502 decides to pay with a registered profile in item 522, the processing may continue with item 526. In this case, the payment and/or billing may be performed automatically based on information stored in or registered with the profile, such as one or more payment instruments and/or pre-set options, such that the payment gateway (not shown) may directly bill the customer based on the registered profile. In an optional step 526, the customer 502 may be asked by the smartphone or electronic device of the customer 502 to select a tip and the processing may end in item 528. Based on the billing and payment processing shown in FIG. 5C, the restaurant may have real-time access to cash boxes, daily reports, tips, and the like.

While FIGS. 5A to 5C show individual entities, such as customer 502, waiter 504, and kitchen 514 of a restaurant, it is to be understood that the present disclosure is not limited to ordering and billing in restaurants only. Rather, the customer 502, the waiter 504, and the kitchen 514 are to be understood as stakeholders which are not required to correspond to real persons, but may reflect virtual entities, such as virtual customers and virtual staff of a virtual provider of goods or services in a social network or a gaming environment. Accordingly, the entities may be simulated or represented by modules of electronic devices in order to perform their respective functionality.

Embodiments of the present disclosure provide for a personalized and continuously updated ordering and billing information provided to them by electronic devices, such as via an app of a smartphone. This enables a dynamic customer experience and interaction and provides instant, personalized, and continuously updated ordering and billing information to individual customers.

The techniques described herein may be implemented in various computing systems, examples of which are described in greater detail above. Such systems generally involve the use of suitably-configured computing devices implementing a number of modules, each providing one or more operations needed to complete execution of such techniques. Each module may be implemented in its own way. As used herein, a module is a structural component of a system which performs an operational flow. A module may comprise computer-executable instructions, and may be encoded on a computer storage medium. Modules may be executed in parallel or serially, as appropriate, and may pass information between one another using a shared memory on the computer on which they are executed, using a message passing protocol or in any other suitable way. Furthermore, modules may be implemented as dedicated hardware or a combination of software and hardware in any combination.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method for automatically maintaining orders on a networked computer, comprising:
   maintaining, by the networked computer, information on an order including one or more entries, said information being associated with at least one ordering entity;
   receiving, by the networked computer, data indicative of an update of the order from the at least one ordering entity via a network;
   processing the data by the networked computer;
   updating, by the networked computer, a summary of the order; and
   providing, by the networked computer, the summary to the at least one ordering entity via the network in response to a trigger,
   wherein the at least one ordering entity is automatically connected to an access point of the network, and wherein the trigger is generated in response to a log-out of the at least one ordering entity from the access point of the network.

2. The method according to claim 1, further comprising verifying whether the at least one ordering entity is an authenticated ordering entity, and only processing the data from authenticated ordering entities.

3. The method according to claim 2, further comprising maintaining in the information one or more flags indicating whether the at least one ordering entity is an authenticated ordering entity.

4. The method according to claim 1, wherein said order is associated with at least one processing entity.

5. The method according to claim 4, further comprising receiving further data indicative of an update via the network from the at least one processing entity.

6. The method according to claim 1, wherein said processing the data includes generating one or more further entries and inserting the one or more further entries into the information on the order.

7. The method according to claim 6, wherein said processing the data further includes forwarding, via the network, the processed data to at least one processing entity.

8. The method according to claim 1, wherein the trigger is generated by the at least one ordering entity or at least one processing entity.

9. The method according to claim 1, wherein the information is provided via the network to a gateway configured to allow a user of the at least one ordering entity to make a payment using a stored profile.

10. The method according to claim 9, wherein the payment is processed automatically in response to the at least one ordering entity leaving an area defined by a geo-fence.

11. The method according to claim 1, wherein the method is for taking orders and billing guests operating said at least one ordering entity in a restaurant.

12. A networked system, comprising:
a network including hardware infrastructure;
a server connected to the network, said server being implemented on a hardware device; and
one or more ordering entities connected to the server via the network, wherein each ordering entity is implemented on a hardware device, the server being configured to:
maintain information on an order including one or more entries, said information being associated with at least one of the one or more ordering entities;
receive data indicative of an update of the order from the at least one ordering entity via the network;
process the data and update a summary of the order; and
provide the summary to the at least one ordering entity via the network in response to a trigger,
wherein the at least one ordering entity is automatically connected to an access point of the network, and wherein the trigger is generated in response to a log-out of the at least one ordering entity from the access point of the network.

13. The system according to claim 12, wherein the server is further configured to verify whether the at least one ordering entity is an authenticated ordering entity, and only process the data from authenticated ordering entities.

14. The system according to claim 13, wherein the server is further configured to maintain in the information one or more flags indicating whether the at least one ordering entity is an authenticated ordering entity.

15. The system according to claim 12, wherein said order is associated with at least one processing entity.

16. The system according to claim 15, wherein further data indicative of an update is received via the network from the at least one processing entity.

17. The system according to claim 12, wherein to process the data the server is further configured to generate one or more further entries and insert the one or more further entries into the information on the order.

18. The system according to claim 17, wherein to process the data the server is further configured to forward, via the network, the processed data to at least one processing entity.

19. The system according to claim 12, wherein the trigger is generated by the at least one ordering entity or at least one processing entity.

20. The system according to claim 12, further comprising a gateway device configured to allow a user of the at least one ordering entity to make a payment using a stored profile.

21. The system according to claim 20, wherein the payment is processed automatically in response to the at least one ordering entity leaving an area defined by a geo-fence.

* * * * *